United States Patent
Lii et al.

(10) Patent No.: US 8,102,376 B2
(45) Date of Patent: Jan. 24, 2012

(54) METHOD FOR OBJECT DETECTION ON A CAPACITIVE TOUCHPAD

(75) Inventors: Jia-Yih Lii, Taichung (TW); Kuan-Chun Tang, Toufen Township, Miaoli County (TW)

(73) Assignee: Elan Microelectronics Corporation, Hsinchu (TW)

( * ) Notice: Subject to any disclaimer, the term of this patent is extended or adjusted under 35 U.S.C. 154(b) by 855 days.

(21) Appl. No.: 11/318,883

(22) Filed: Dec. 28, 2005

(65) Prior Publication Data
US 2006/0279551 A1    Dec. 14, 2006

(30) Foreign Application Priority Data
Jun. 8, 2005    (TW) .............................. 94118947 A (51) Int. Cl.
*G06F 3/041*    (2006.01)
(52) U.S. Cl. ........................................................ 345/173
(58) Field of Classification Search ........... 345/173–178
See application file for complete search history.

(56) References Cited

U.S. PATENT DOCUMENTS

| | | | | |
|---|---|---|---|---|
| 5,463,388 A * | 10/1995 | Boie et al. | ...................... | 341/33 |
| 5,825,351 A * | 10/1998 | Tam | ............................... | 345/173 |
| 5,825,352 A * | 10/1998 | Bisset et al. | .................... | 345/173 |
| 5,880,411 A * | 3/1999 | Gillespie et al. | ............ | 178/18.01 |
| 2003/0063073 A1* | 4/2003 | Geaghan et al. | ............... | 345/173 |
| 2004/0056847 A1* | 3/2004 | Yoshihara | ...................... | 345/173 |
| 2004/0178998 A1* | 9/2004 | Sharp et al. | .................... | 345/177 |
| 2006/0132456 A1* | 6/2006 | Anson | ............................. | 345/173 |
| 2007/0008295 A1* | 1/2007 | Chien et al. | .................... | 345/173 |

* cited by examiner

*Primary Examiner* — Chanh Nguyen
*Assistant Examiner* — Long Pham
(74) *Attorney, Agent, or Firm* — Rosenberg, Klein & Lee (57) ABSTRACT

In an object detection method for a capacitive touchpad, at least one reference time interval is used to distinguish whether a variation of the sensed value on the touchpad is resulted from an operation of an object on the touchpad, actions such as an object touch down to the touchpad, an object lift from the touchpad and an object movement on the touchpad are then determined, and operations corresponding to various gestures are correctly detected.

14 Claims, 11 Drawing Sheets

PRIOR ART

METHOD FOR OBJECT DETECTION ON A CAPACITIVE TOUCHPAD

FIELD OF THE INVENTION

The present invention is generally related to a detection method for a touchpad and, more specifically, to a noise resistive method for object detection on a capacitive touchpad.

BACKGROUND OF THE INVENTION

Capacitive touchpad is an input device to control cursor movement by providing a smooth panel for user's finger or conductive object to touch or move thereon. Since capacitive touchpad is very thin, it can be designed into ultra-thin notebook, keyboard, digital player and other devices, and further, its non-mechanical design makes it very easy to be maintained.

Figure 1:
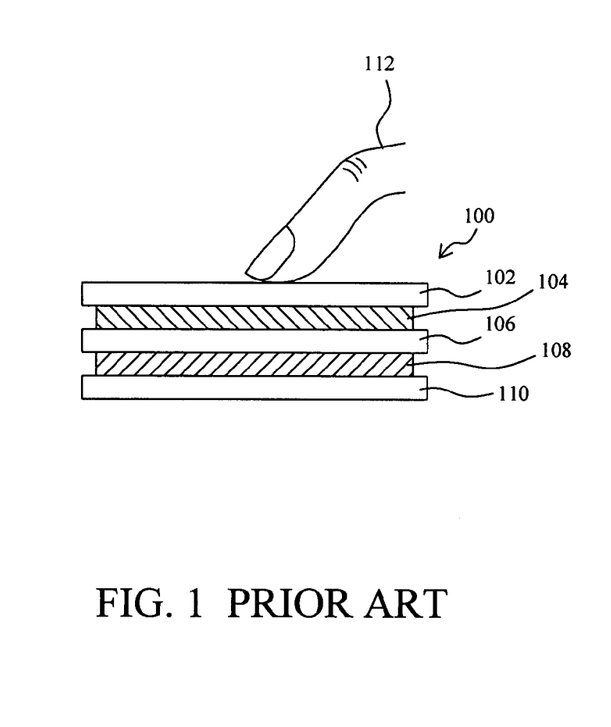
FIG. 1 is a cross-sectional view of a conventional two-dimensional capacitive touchpad.
Figure 2:
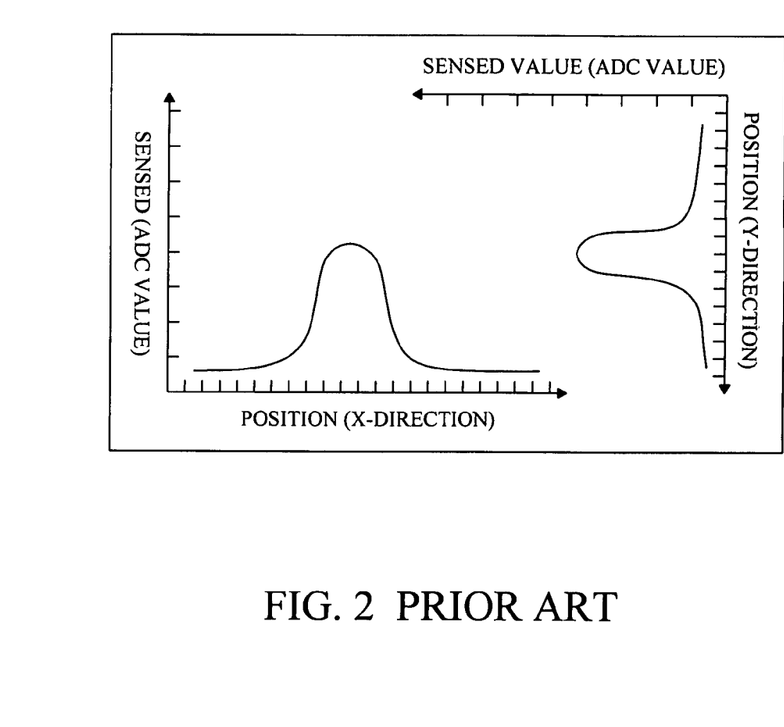
FIG. 2 shows a relationship between the sensed value and the touched position of the touchpad shown in FIG. 1.
Figure 3:
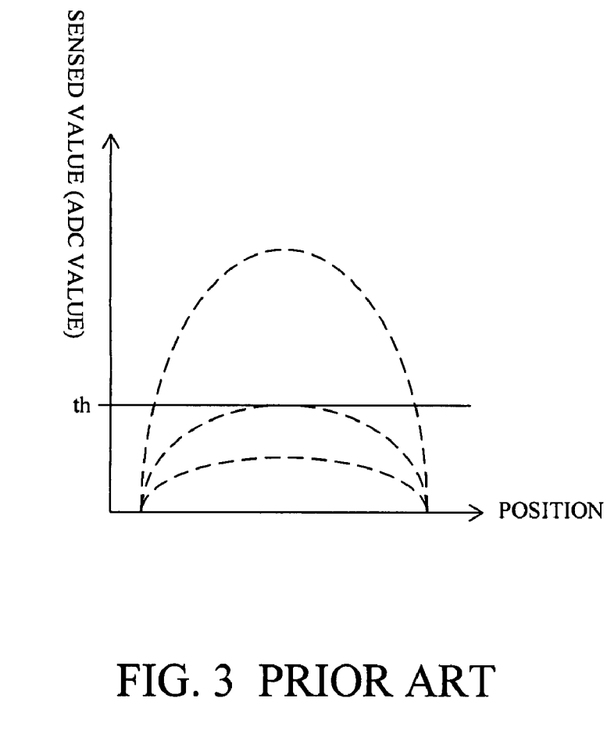
FIG. 3 shows a variation of the sensed value on the touchpad shown in FIG. 1.

FIG. 1 is a cross-sectional view of a conventional two-dimensional capacitive touchpad 100, which comprises a panel 102, a Y-axis sensing layer 104, an insulator layer 106, an X-axis sensing layer 108, and a bottom plate 110. When a finger 112 touches on the panel 102, the sensed value (in capacitance) on the touched position will have a variation, and the control circuit connected to the touchpad 100 can convert the capacitance on the touchpad 100 to a sensed value as shown in FIG. 2, by which the position where the finger 112 touches and the moving distance and the moving direction of the finger 112 can be determined. Conventionally, the sensed value on the touchpad 100 is used to determine if an object touches on the touchpad 100 by the way as shown in FIG. 3. When the sensed value is greater than a threshold th, it is determined that an object touches on the touchpad 100, and on the contrary, when the sensed value is less than the threshold th, it is determined that the object leaves the touchpad 100 or no object touches on the touchpad 100.

Figure 4A:
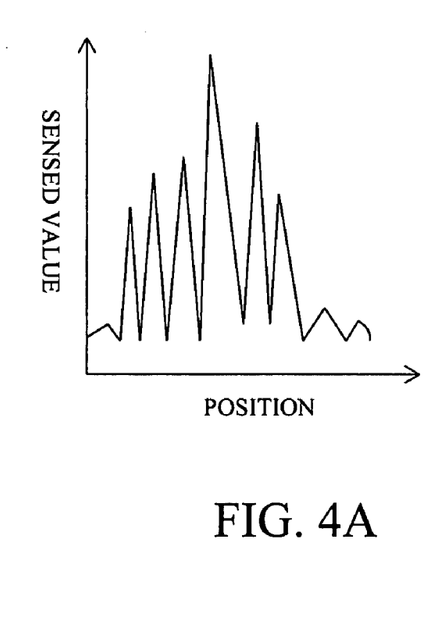
FIG. 4A shows an exemplary noise applied to the touchpad shown in FIG. 1.
Figure 4B:
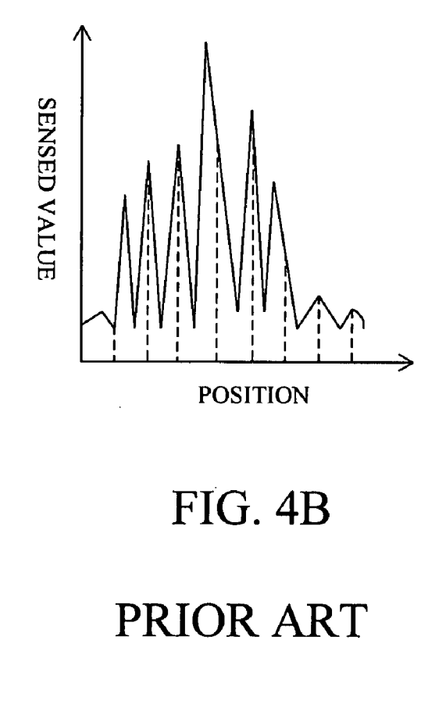
FIG. 4B shows the sensed value from the noise shown in FIG. 4A converted by an analog-to-digital converter.
Figure 4C:
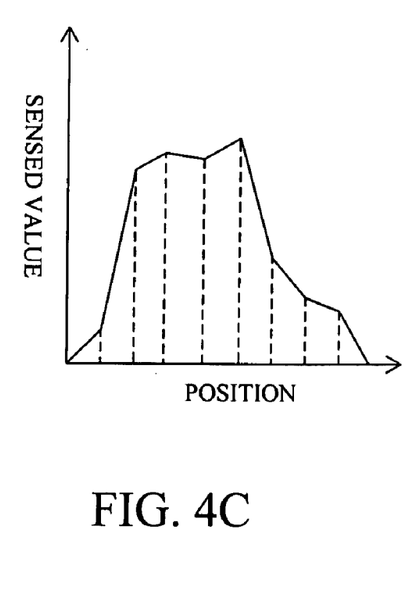
FIG. 4C shows the waveform by sampling the sensed value shown in FIG. 4B.
Figure 5:
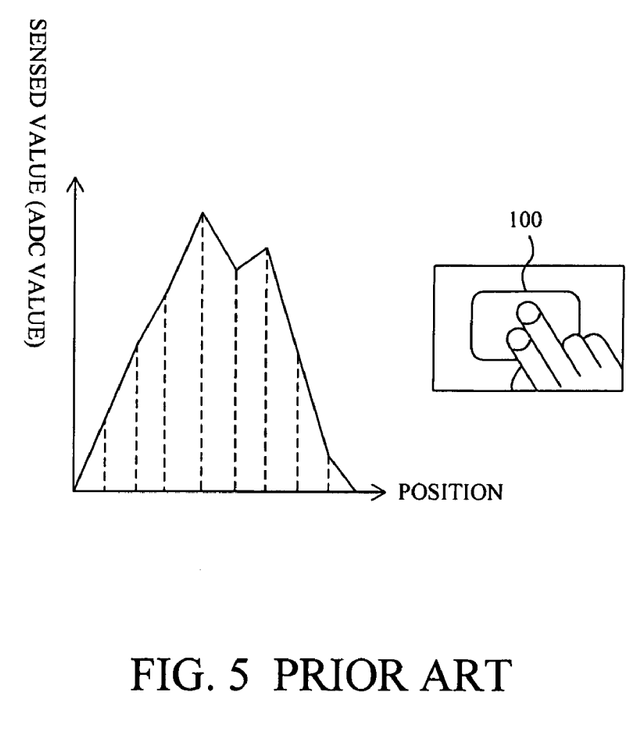
FIG. 5 shows a detected waveform of the sensed value when two fingers touch on the touchpad shown in FIG. 1.

However, the detection for the touchpad 100 might be interfered by noise resulted from wireless device such as mobile phone and others, and therefore, the touchpad 100 might misjudge that an object touches, taps, moves or practices any gesture thereon. FIG. 4A is an example showing a noise generated on the touchpad 100, the noise will be converted to a sensed value by an analog-to-digital converter (ADC) as shown in FIG. 4B, and finally, by a sampling process, it will become a waveform as shown in FIG. 4C. The waveform of FIG. 4C is similar to one generated when two fingers touch on the touchpad 100 as shown in FIG. 5, and therefore, the noise exemplary shown in FIG. 4A could be misjudged to be an operation of two fingers touching on the touchpad 100, thereby causing the touchpad 100 to have an operation that is not desired or predicted.

Therefore, there is a need of a detection method for a touchpad that will avoid noise to interfere the operation of the touchpad.

SUMMARY OF THE INVENTION

An object of the present invention is to provide an object detection method for a capacitive touchpad for preventing the operation of the touchpad from noise interference.

In an object detection method for a capacitive touchpad, according to the present invention, at least one reference time interval is used to distinguish whether a variation of the sensed value on the touchpad is resulted from an operation of an object on the touchpad, actions such as an object touch down to the touchpad, an object lift from the touchpad and an object moving on the touchpad are then determined, and operations corresponding to various gestures are correctly detected.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

In a detection method for a capacitive touchpad according to the present invention, the noise resistive capability of the touchpad is enhanced without any improvement on the hardware detection circuit of the touchpad, and several gestures for operations on the touchpad can be distinguished by such method.

<Detection for Verifying an Object Down>

Figure 6:
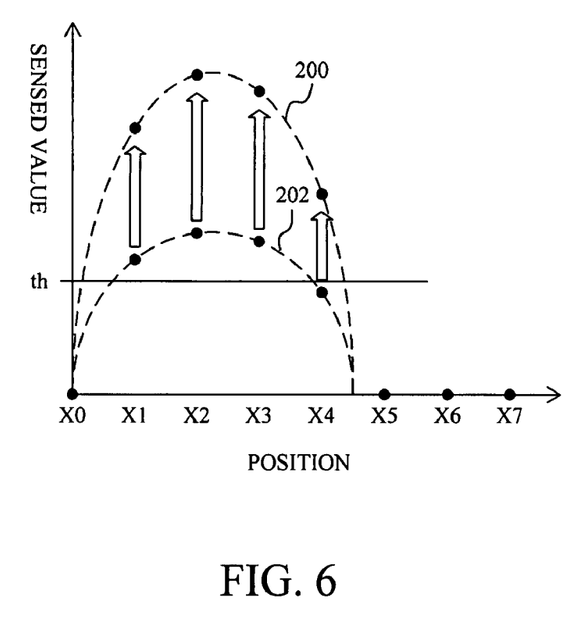
FIG. 6 shows a variation of the sensed value on the touchpad shown in FIG. 1 when the sensed value becomes greater than a down threshold.
Figure 7:
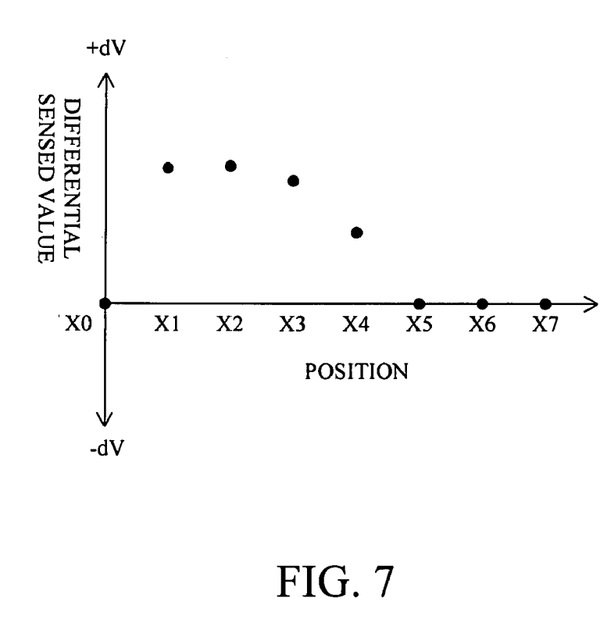
FIG. 7 shows a difference between two sensed values shown in FIG. 6.
Figure 8:
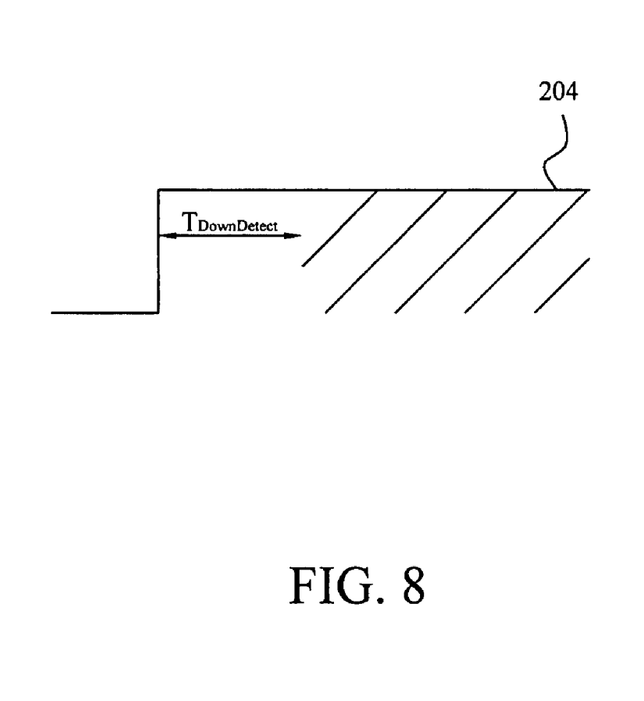
FIG. 8 shows a detected signal.

In FIG. 6, it is shown a variation of the sensed value on the touchpad 100 shown in FIG. 1 when the sensed value becomes greater than a down threshold th, in which curve 200 represents the sensed value at this time and curve 202 represents the sensed value at the last time. FIG. 7 shows the difference between the sensed values 200 and 202 of FIG. 6, and FIG. 8 shows a detected signal 204. In a detection of the sensed value on the touchpad 100, when the sensed value is detected greater than the down threshold th as shown in FIG. 6, the detected signal 204 will transit from low to high as shown in FIG. 8, and then, within a time interval $T_{DownDetect}$, the sensed value on the touchpad 100 is continuously detected and the differential sensed value dV is calculated by subtracting each current sensed value 202 by the last sensed value 200 as shown in FIG. 7. If the differential sensed value dV within the time interval $T_{DownDetect}$ maintains positive, it is determined that an object touches down to the touchpad 100.

<Detection for Verifying a Touch Gesture>

Figure 9:
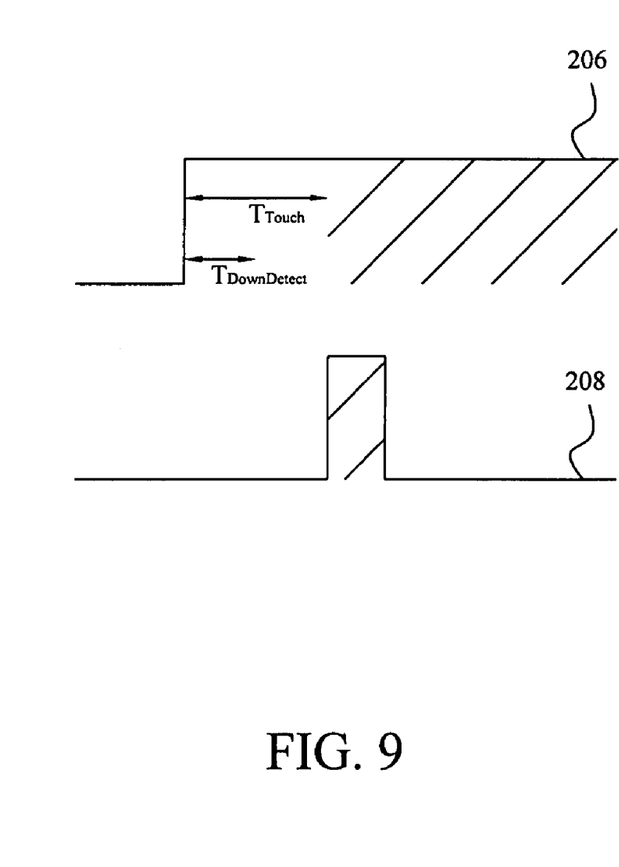
FIG. 9 shows a detected signal and a touch signal.

FIG. 9 shows a detected signal 206 and a touch signal 208. Once an object is determined to touch down to the touchpad 100, the time duration that the object lasts on the touchpad 100 is counted. After the detection for verifying an object down confirms that the object indeed touches down to the touchpad 100, if the object continuously stays on the touchpad 100 for a time duration equal to a reference time interval $T_{Touch}$, the touch signal 208 is produced and a position information of the object is calculated and sent out.

<Detection for Verifying an Object Lift>

Figure 10:
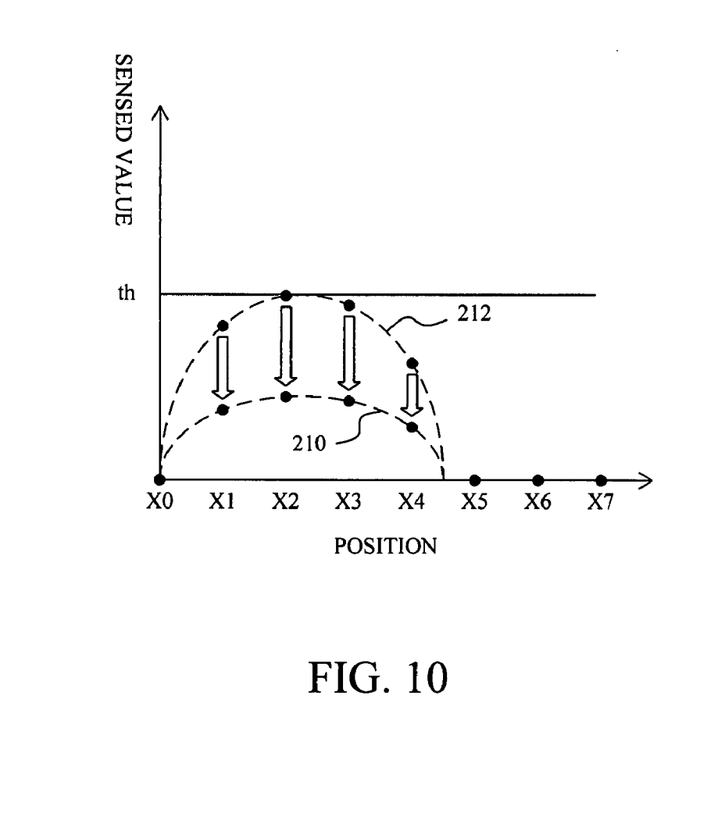
FIG. 10 shows a variation of the sensed value on the touchpad shown in FIG. 1 when the sensed value becomes less than a lift threshold.
Figure 11:
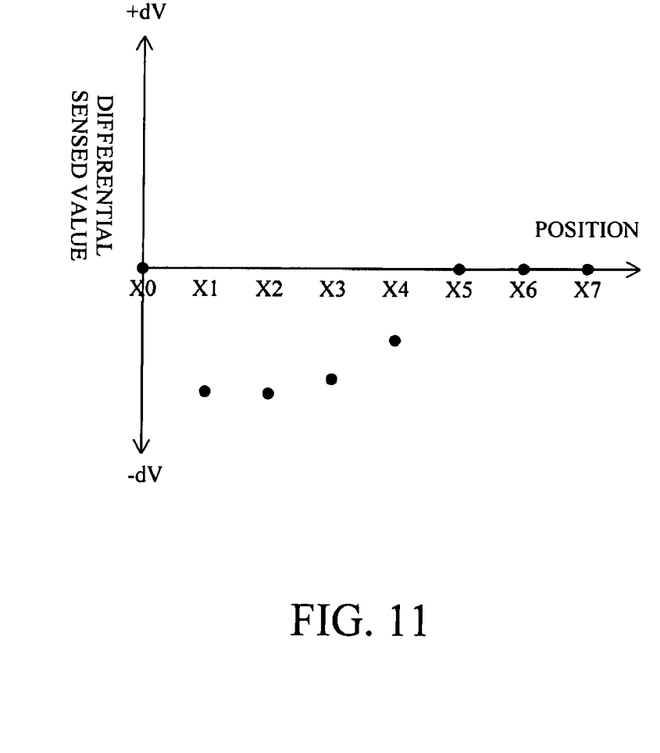
FIG. 11 shows a difference between two sensed values shown in FIG. 10.
Figure 12:
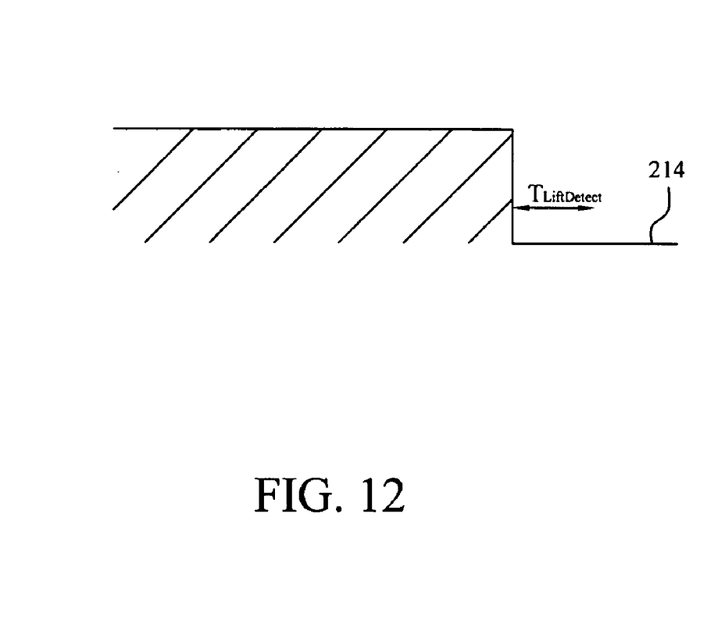
FIG. 12 shows a detected signal.

FIG. 10 shows a variation of the sensed value on the touchpad 100 shown in FIG. 1 when the sensed value becomes less than a lift threshold th, in which curve 210 represents the sensed value at this time and curve 212 represents the sensed value at the last time, FIG. 11 shows the difference between the sensed values 210 and 212 of FIG. 10, and FIG. 12 shows a detected signal 214. When an object has touched on the touchpad 100, once the sensed value is detected less than the lift threshold th as shown in FIG. 10, the detected signal 214 will transit from high to low as shown in FIG. 12, and then, within a time interval $T_{LiftDetect}$, the sensed value on the touchpad 100 is continuously detected and the differential sensed value dV is calculated by subtracting each current sensed value 210 by the last sensed value 212 as shown in FIG. 11. If the differential sensed value dV within the time interval $T_{LiftDetect}$ maintains negative, it is determined that the object leaves from the touchpad 100.

<Detection for Verifying a Lift Gesture>

Figure 13:
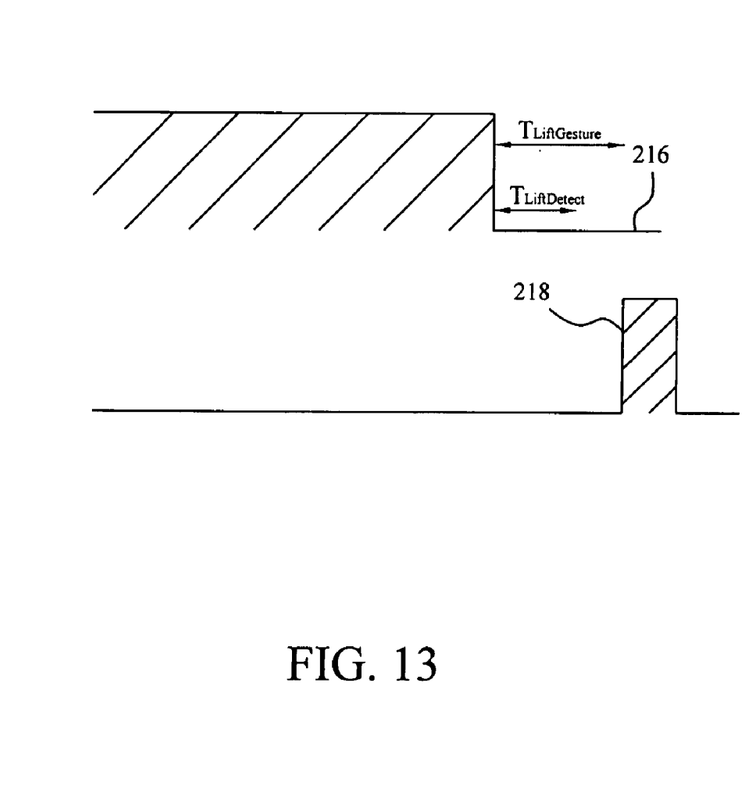
FIG. 13 shows a detected signal and a lift signal.

FIG. 13 shows a detected signal 216 and a lift signal 218. Once an object is detected to leave from the touchpad 100, the time duration after the object leaves the touchpad 100 is counted. If the detection for verifying an object lift confirms that the object indeed leaves from the touchpad 100 and the object leaves the touchpad 100 for a time duration equal to a reference time interval $T_{LiftGesture}$, the lift signal 218 is produced.

<Detection for Verifying an Object Moving>

Figure 14:
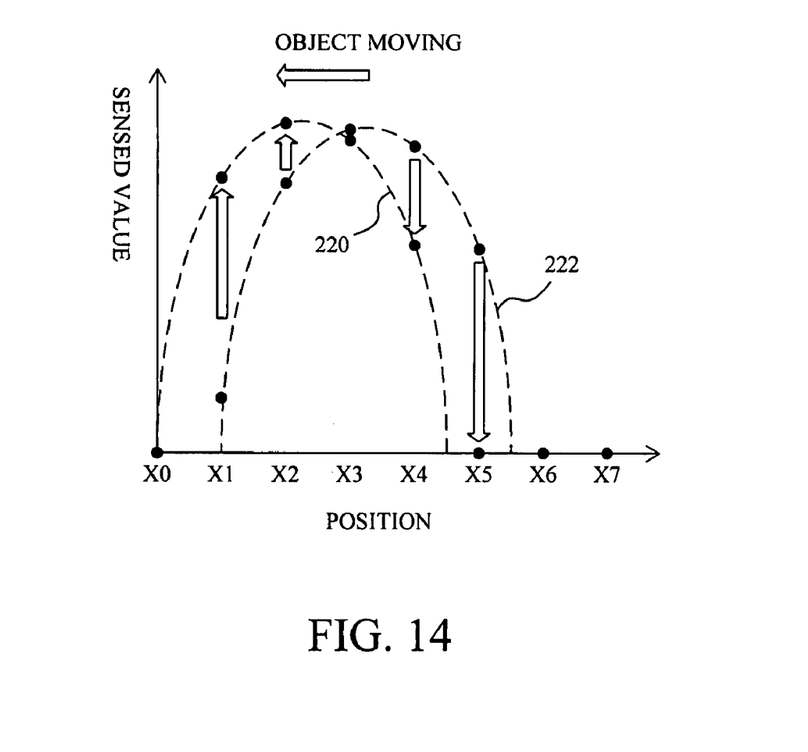
FIG. 14 shows a variation of the sensed value on the touchpad shown in FIG. 1 when an object moves from still to left side.
Figure 15:
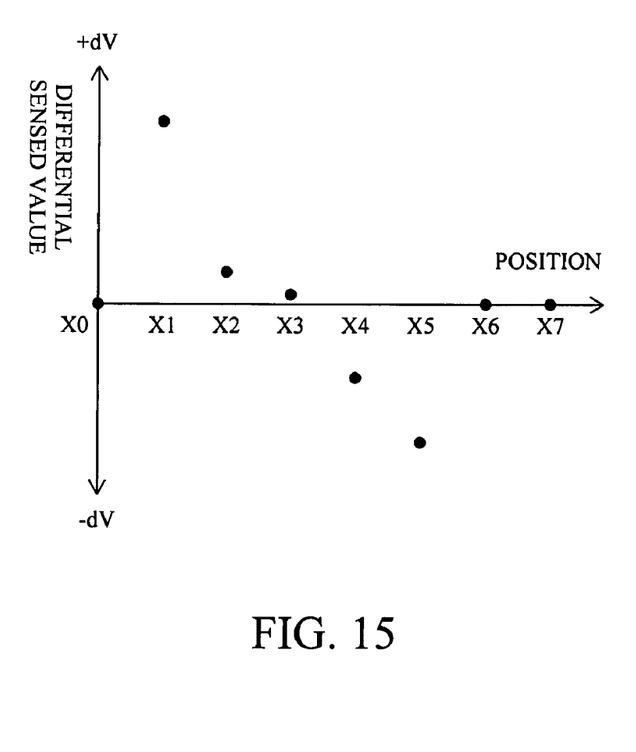
FIG. 15 shows a difference between two sensed values shown in FIG. 14.

The variation of an object on the touchpad 100 from still to move is verified to avoid noise or slight vibration of the object to cause a misjudgment on the object position which will result in the corresponding cursor to have wrong action. FIG. 14 shows a variation of the sensed value on the touchpad 100 shown in FIG. 1 when an object on the touchpad 100 moves from still to left, in which curve 220 represents the sensed value at this time and curve 222 represents the sensed value at the last time, and FIG. 15 shows the difference between the sensed values 220 and 222 shown in FIG. 14. After an object is verified to touch on the touchpad 100, the sensed value on the touchpad 100 is continuously detected and the differential sensed value dV is calculated by subtracting each current sensed value 220 by the last sensed value 222. Within a time interval $T_{Movingdetect}$, if the left side of the object is detected to have the differential sensed value dV in an increasing trend and the right side of the object is detected to have the differential sensed value dV in a decreasing trend as shown in FIGS. 14 and 15, the object is determined to move from still to left. On the contrary, within the reference time interval $T_{Movingdetect}$, if the left side of the object is detected to have the differential sensed value dV in a decreasing trend and the right side of the object is detected to have the differential sensed value dV in an increasing trend, the object is determined to move from still to right.

<Detection for a Moving Gesture>

If an object is detected to move on the touchpad 100 first time and the detection for verifying an object moving confirms that the object indeed moves on the touchpad 100, a position information of the object is calculated and sent out. Thereafter, if the object is detected to move on the touchpad 100 again within a time interval shorter than a reference time interval $T_{Moving}$, the position information of the object is calculated and sent out once more.

<Detection for a Tap Gesture>

Figure 16:
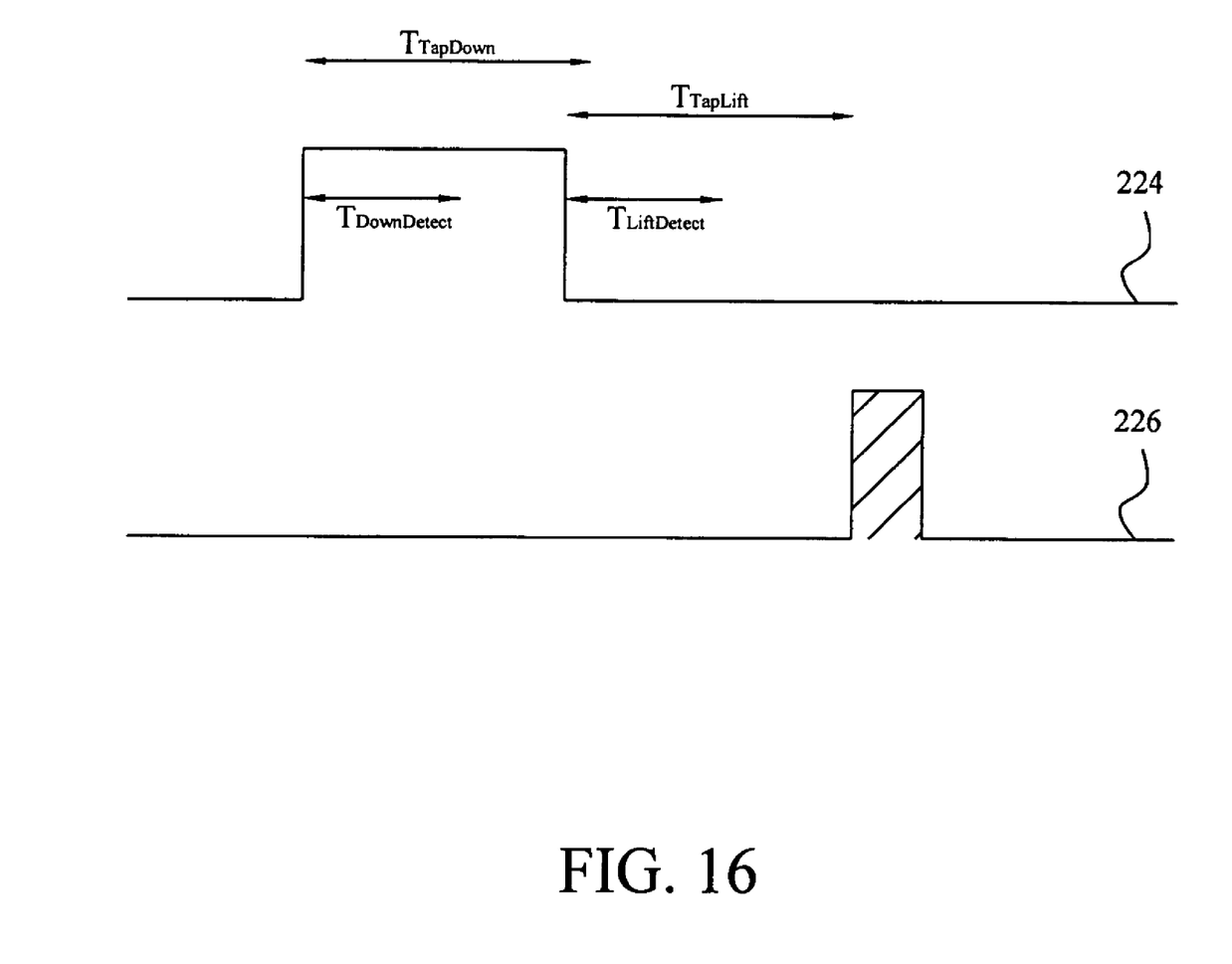
FIG. 16 shows a detected signal and a tap signal.

FIG. 16 shows a detected signal 224 and a tap signal 226. In response to an object touching down to the touchpad 100, the detected signal 224 transits from low to high and then the time duration that the object lasts on the touchpad 100 is counted. If the detection for verifying an object down confirms that the object indeed touches down to the touchpad 100 and the object is further detected to leave from the touchpad 100 before a reference time interval $T_{TapDown}$ is reached, the detected signal 224 transits from high to low, and the time duration after the object leaves the touchpad 100 is counted. If the detection for verifying an object lift confirms that the object indeed leaves the touchpad 100 and the object leaves the touchpad 100 for a time duration equal to a reference time interval $T_{TapLift}$, the tap signal 226 is produced, and the tap position information is calculated and sent out.

<Detection for a Drag Gesture>

Figure 17:
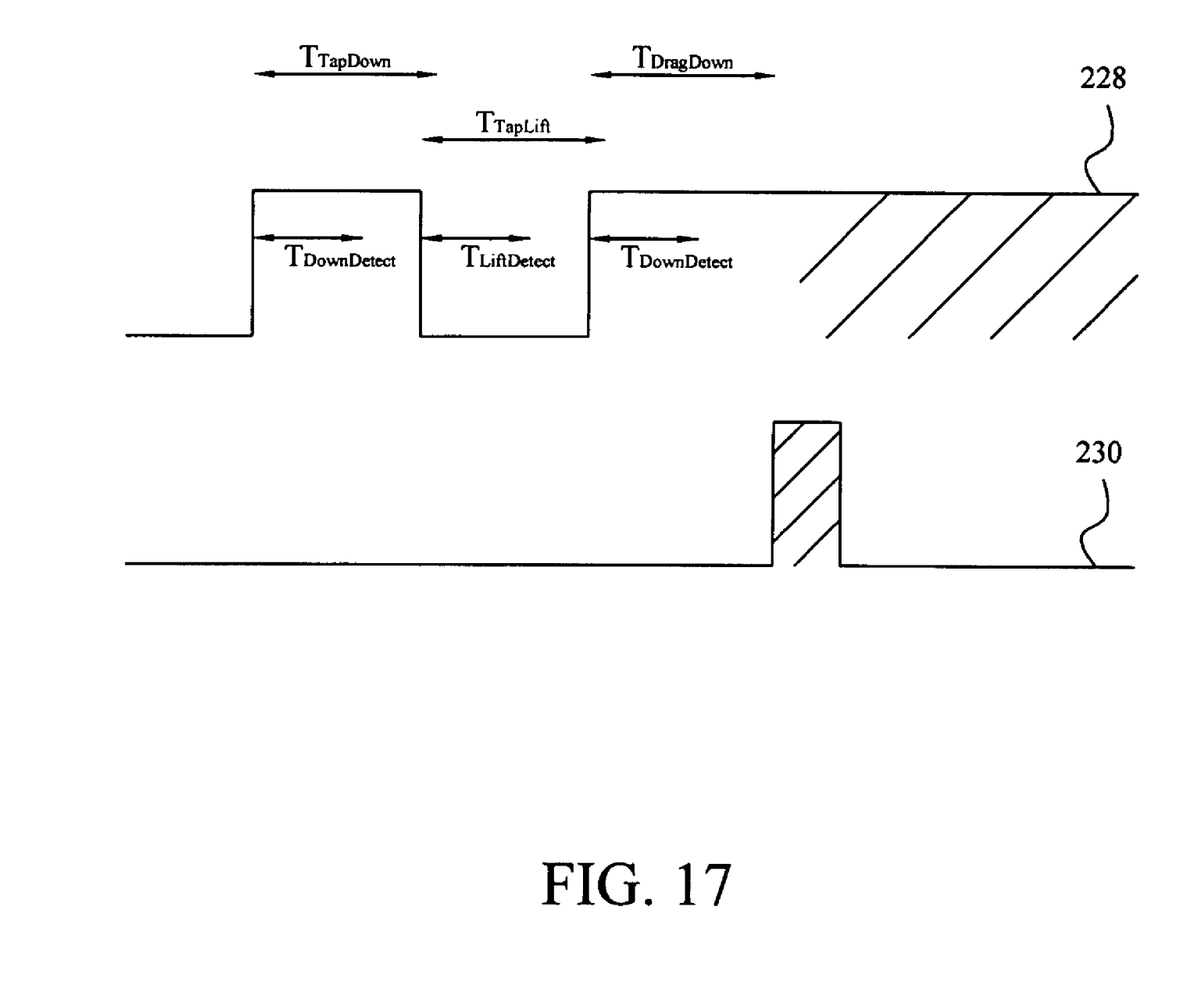
FIG. 17 shows a detected signal and a drag signal.

FIG. 17 shows a detected signal 228 and a drag signal 230. When an object is detected to touch down to the touchpad 100 first time, the detected signal 228 transits from low to high and then the time duration that the object lasts on the touchpad 100 is counted. If the detection for verifying an object down confirms that the object indeed touches down to the touchpad 100 and the object is further detected to leave from the touchpad 100 before a reference time interval $T_{TapDown}$ is reached, the detected signal 224 transits from high to low, and the time duration after the object leaves the touchpad 100 is counted. If the detection for verifying an object lift confirms that the object indeed leaves the touchpad 100 and the touchpad 100 is detected to be touched again before a reference time interval $T_{TapLift}$ is reached, the detected signal 228 transits again from low to high, and the time duration that the object lasts on the touchpad 100 is counted again. If the detection for verifying an object down confirms that the object indeed touches down to the touchpad 100 and the object lasts on the touchpad 100 this second time for a time period equal to a reference time interval $T_{DragDown}$, the drag signal 230 is produced and the position information of the object is calculated and sent out.

<Detection for a Double Tap Gesture>

Figure 18:
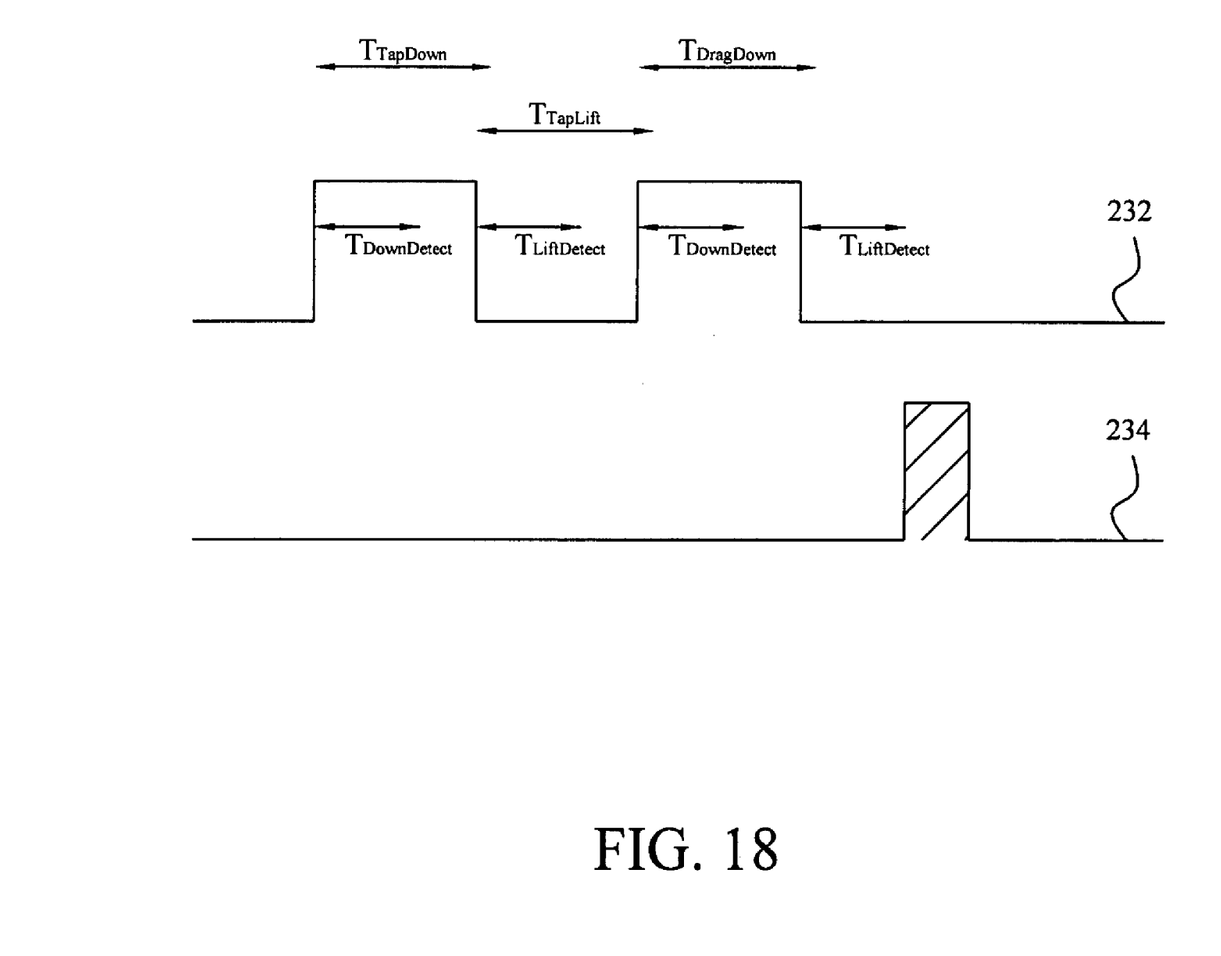
FIG. 18 shows a detected signal and a double tap signal.

FIG. 18 shows a detected signal 232 and a double tap signal 234. When the touchpad 100 is touched by an object first time, the detected signal 232 transits from low to high and then the time duration that the object lasts on the touchpad 100 is counted. After the detection for verifying an object down confirms that the object indeed touches down to the touchpad 100, if the object leaves the touchpad 100 before a reference time interval $T_{TapDown}$, the detected signal 232 transits from high to low and the time duration after the object leaves the touchpad 100 is counted. If the detection for verifying an object lift confirms that the object indeed leaves from the touchpad 100 and the touchpad 100 is touched again before the time duration that the object leaves the touchpad 100 reaches a reference time interval $T_{TapLift}$, the detected signal 232 transits again from low to high, and the time duration that the object lasts on the touchpad 100 in this second touch is counted. If the detection for verifying an object down confirms that the touchpad 100 is indeed touched by an object again, and the object leaves from the touchpad 100 again before the time duration that the object lasts on the touchpad 100 in the second touch reaches a reference time interval $T_{DragDown}$, the detected signal 232 transits from high to low again. If the detection for verifying an object lift confirms that the object indeed leaves the touchpad 100 again, the double tap signal 234 is produced and a position information of the object is calculated and sent out.

In the above embodiments, by monitoring the variation of the sensed value on the touchpad 100 and the various time durations that an object lasts on the touchpad 100 or leaves the touchpad 100, the various operations on the touchpad 100 are distinguished correctly, and the misjudgments due to noise interference are avoided.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. An object detection method for a capacitive touchpad, comprising the steps of:
    monitoring a set of sensed capacitive values corresponding to multiple positional locations of the object on the touchpad;
    subtracting a first sensed capacitive value at each positional location during a first time interval from a second sensed capacitive value at each positional location at a second time interval forming a set of differential sensed capacitive values; and
    determining that the object has left the touchpad when the set of differential sensed capacitive values between the first and second time intervals is negative and the sets of first and second sensed capacitive values are below a predetermined threshold.

2. The method of claim 1, further comprising the step of verifying that the object has touched on the touchpad before the step of monitoring a sensed capacitive value on the touchpad.

3. The method of claim 1, further comprising the steps of:
    counting a time duration after the object is determined to have left the touchpad; and
    producing a lift signal if the time duration reaches a second reference time interval.

4. An object detection method for a capacitive touchpad, comprising the steps of:
    monitoring a set of sensed capacitive values corresponding to multiple positional locations of the object on the touchpad;
    subtracting a first sensed capacitive value at each positional location during a first time interval from a second sensed capacitive value at each positional location at a second time interval forming a set of differential sensed capacitive values; and
    determining that the object moves in a first direction from a reference position when the set of differential sensed capacitive values between the first and second time intervals is positive at points on the touchpad offset from the reference position in the first direction and negative at points on the touchpad offset from the reference position in a second direction opposite the first direction.

5. The method of claim 4, further comprising the step of verifying that the object touches on the touchpad before the step of monitoring a sensed capacitive value on the touchpad.

6. An object detection method for a capacitive touchpad, comprising the steps of:
    monitoring a set of sensed capacitive values corresponding to multiple positional locations of the object on the touchpad;
    subtracting a first sensed capacitive value at each positional location during a first time interval from a second sensed capacitive value at each positional location at a second time interval forming a set of differential sensed capacitive values;
    determining that the object moves in a first direction from a reference position when the set of differential sensed capacitive values between the first and second time intervals is positive at points on the touchpad offset from the reference position in the first direction and negative at points on the touchpad offset from the reference position in a second direction opposite to the first direction;
    calculating a position information of the object and sending out the position information; and
    repeating the previous step if the object is detected to move on the touchpad again before a time duration after the previous time the object is detected to move on the touchpad reaches the reference time interval.

7. The method of claim 6, further comprising the step of verifying that the object touches on the touchpad before the step of monitoring a sensed capacitive value on the touchpad.

8. An object detection method for a capacitive touchpad, comprising the steps of:
    verifying that an object has touched on the touchpad responsive to continuous variation of a set of sensed capacitive values corresponding to multiple positional locations of the object during a reference time interval including the step of subtracting a currently sensed capacitive value at each positional location during a first time interval from a second sensed capacitive value at each positional location at a second time interval forming a set of differential sensed capacitive values;
    counting a first time duration that the object remains on the touchpad;
    verifying that the object has left the touchpad if the object is detected to leave the touchpad before the first time duration reaches a first reference time interval;
    counting a second time duration after the object has left the touchpad; and
    producing a tap signal if the second time duration reaches a second reference time interval;
    wherein the step of verifying that the object leaves the touchpad comprises the steps of:
        monitoring the set of sensed capacitive values corresponding to multiple positional locations of the object on the touchpad;
        subtracting a currently sensed capacitive value at each positional location during a third time interval from a second sensed capacitive value at each positional location at a fourth time interval forming a set of differential sensed capacitive values; and
        determining that the object has left the touchpad when the set of differential sensed capacitive values is below the threshold within a third reference time interval and the set of differential sensed capacitive values remains negative during the third reference time interval.

9. The method of claim 8, wherein the step of verifying that an object has touched down on the touchpad comprises the steps of:
- monitoring the sensed capacitive value on the touchpad;
- monitoring a variation of the sensed capacitive value when the sensed capacitive value is greater than a threshold; and
- determining that the object has touched on the touchpad if the sensed capacitive value remains greater than the threshold within a third reference time interval and the differential sensed capacitive value remains positive during the third reference time interval.

10. The method of claim 8, further comprising the step of calculating a position information of the object and sending out the position information if the tap signal is produced.

11. An object detection method for a capacitive touchpad, comprising the steps of:
- monitoring a set of sensed capacitive values corresponding to multiple positional locations of the object on the touchpad;
- subtracting a currently sensed capacitive value at each positional location during a first time interval from a second sensed capacitive value at each positional location at a second time interval forming a set of differential sensed capacitive values;
- determining that the object has touched on the touchpad when the set of sensed capacitive values between the first and second time intervals is positive and the sets of currently and second sensed capacitive values remains greater than the threshold;
- counting a first time duration that the object remains on the touchpad;
- verifying that the object has left the touchpad if the object is detected to leave the touchpad before the first time duration reaches a second reference time interval;
- counting a second time duration after the object has left the touchpad;
- verifying that the object has touched on the touchpad again if the touchpad is detected to be touched again before the second time duration reaches a third reference time interval;
- counting a third time duration that the object remains on the touchpad in the second touch; and
- producing a drag signal if the third time duration reaches a fourth reference time interval;
- wherein the step of verifying that the object leaves the touchpad comprises the steps of:
  - monitoring the set of sensed capacitive values on the touchpad;
  - subtracting a currently sensed capacitive value at each positional location during a third time interval from a second sensed capacitive value at each positional location at a fourth time interval forming a set of differential sensed capacitive values; and
  - determining that the object has left the touchpad when the set of sensed capacitive values remains less than the threshold within a fifth reference time interval and the set of differential sensed capacitive values remains negative during the fifth reference time interval.

12. The method of claim 11, further comprising the step of calculating a position information of the object and sending out the position information if the drag signal is produced.

13. An object detection method for a capacitive touchpad, comprising the step of:
- monitoring a set of sensed capacitive values corresponding to multiple positional locations of the object on the touchpad;
- subtracting a currently sensed capacitive value at each positional location during a first time interval from a second sensed capacitive value at each positional location at a second time interval forming a set of differential sensed capacitive values;
- determining that the object has touched the touchpad when the set of differential sensed capacitive values is greater than the threshold within a first reference time interval and the set of differential sensed capacitive values is positive during the first reference time interval;
- counting a first time duration that the object remains on the touchpad;
- verifying that the object has left the touchpad if the object is detected to leave the touchpad before the first time duration reaches a second reference time interval;
- counting a second time duration after the object leaves the touchpad;
- verifying that the object has touched on the touchpad again if the touchpad is detected to be touched again before the second time duration reaches a third reference time interval;
- counting a third time duration that the object remains on the touchpad in the second touch;
- verifying that the object has left from the touchpad if the object is detected to leave the touchpad again before the third time duration reaches a fourth reference time interval; and
- producing a double tap signal if the object is verified to leave the touchpad in the previous step;
- wherein the step of verifying that the object leaves the touchpad comprises the steps of:
  - monitoring the set of sensed capacitive values corresponding to multiple positional locations of the object on the touchpad;
  - subtracting a currently sensed capacitive value at each positional location during a third time interval from a second sensed capacitive value at each positional location at a fourth time interval forming a set of differential sensed capacitive values; and
  - determining that the object has left the touchpad when the set of sensed capacitive values remains less than the threshold within a fifth reference time interval and the set of differential sensed capacitive values remains negative during the fifth reference time interval.

14. The method of claim 13, further comprising the step of calculating a position information of the object and sending out the position information if the double tap signal is produced.

* * * * *